United States Patent
Huss et al.

(10) Patent No.: US 9,945,932 B2
(45) Date of Patent: Apr. 17, 2018

(54) REAL-TIME MULTI-ARRAY SUM POWER SPECTRUM CONTROL

(71) Applicant: Raytheon Company, Waltham, MA (US)

(72) Inventors: Andrew D. Huss, Somerville, MA (US); John Mcginty, Hudson, MA (US)

(73) Assignee: RAYTHEON COMPANY, Waltham, MA (US)

( * ) Notice: Subject to any disclaimer, the term of this patent is extended or adjusted under 35 U.S.C. 154(b) by 691 days.

(21) Appl. No.: 14/502,797

(22) Filed: Sep. 30, 2014

(65) Prior Publication Data

US 2016/0091596 A1    Mar. 31, 2016

(51) Int. Cl.
| | |
|---|---|
| G01S 7/02 | (2006.01) |
| G01S 13/02 | (2006.01) |
| G01S 13/87 | (2006.01) |
| G01S 7/03 | (2006.01) |

(52) U.S. Cl.
CPC ............... G01S 7/02 (2013.01); G01S 13/02 (2013.01); G01S 13/87 (2013.01); G01S 7/032 (2013.01)

(58) Field of Classification Search
CPC . G01S 7/02; G01S 13/02; G01S 13/87; G01S 7/032
USPC ........................................................ 342/385
See application file for complete search history.

(56) References Cited

U.S. PATENT DOCUMENTS

| | | | |
|---|---|---|---|
| 3,226,630 A | * | 12/1965 | Lampke .................. H02M 3/04 307/96 |
| 4,806,937 A | | 2/1989 | Peil |
| 2004/0061380 A1 | | 4/2004 | Hann et al. |

FOREIGN PATENT DOCUMENTS

| | | |
|---|---|---|
| JP | 2013195156 A | 9/2013 |
| WO | WO 2006/022675 A1 | 3/2006 |

OTHER PUBLICATIONS

Notification of Transmittal of the International Search Report and the Written Opinion of the International Searching Authority, or the Declaration dated Oct. 8, 2015 in connection with International Patent Application No. PCT/US2015/042962.
Notice of Reasons for Rejection in counterpart application Japanese Application No. 2017-517018 dated Dec. 19, 2017, 11 pages.

* cited by examiner

Primary Examiner — Frank J McGue (57) ABSTRACT

Power control for a radar system issues power draw commands to each array in the radar system. Each power draw command controls direct current (DC) power draw by the respective radar array on a dwell-by-dwell basis, based on total energy resources (including stored energy) available to the respective array at the start of a dwell period, a power spend rate expected for the respective array during the dwell period, and a rate of "waste" power set to be dispersed to reduce excess power at the respective array during the dwell period. In determining power draw for an array, the power control takes into account a predetermined number of future dwell periods and any transmit and/or receive tasks scheduled for such periods. If necessary to maintain less than a predetermined ripple on total DC power drawn from a source of the DC power by the radar system, the power control adjusts a duration of empty dwell periods within the dwell schedule for one or more of the arrays.

20 Claims, 5 Drawing Sheets

REAL-TIME MULTI-ARRAY SUM POWER SPECTRUM CONTROL

TECHNICAL FIELD

The present disclosure is directed in general to supplying power to radar systems, and, more particularly, to controlling spectral variations in power drawn by individual loads.

BACKGROUND OF THE DISCLOSURE

The spectral (frequency) characteristics of power drawn by certain types of radar system can be highly variable, potentially stressing power generators and/or impacting other systems drawing power from the same source(s).

There is, therefore, a need in the art for improved real-time power spectrum control.

SUMMARY OF THE DISCLOSURE

Power control for a radar system issues power draw commands to each array in the radar system. Each power draw command controls direct current (DC) power draw by the respective radar array on dwell-by-dwell basis, based on total energy resources (including stored energy) available to the respective array at the start of a dwell period, a power spend rate expected for the respective array during the dwell period, and a rate of "waste" power set to be dispersed to reduce excess power at the respective array during the dwell period. In determining power draw for an array, the power control takes into account a predetermined number of future dwell periods and any transmit and/or receive tasks scheduled for such periods. If necessary to maintain less than a predetermined ripple on total DC power drawn from a source of the DC power by the radar system, the power control adjusts a duration of empty dwell periods within the dwell schedule for one or more of the arrays.

Although specific advantages have been enumerated above, various embodiments may include some, none, or all of the enumerated advantages. Additionally, other technical advantages may become readily apparent to one of ordinary skill in the art after review of the following figures and description.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below. Additionally, unless otherwise specifically noted, articles depicted in the drawings are not necessarily drawn to scale.

Because the power drawn by an active electronically scanned array (AESA) radar can be highly variable, tight requirements may be imposed on the spectral behavior of power draw for such radars on mobile platforms (shipboard, airborne, etc.). For example, based on experience with Dual Band Radar (DBR) on certain ships, the requirements for Air and Missile Defense S-Band (AMDR-S) Radar may include (sum of 4 arrays): total root mean square (RMS) ripple summed over all frequencies on the direct current (DC) power supply must be less than 5% of the full-power DC load, approximately 1000 kilo-Watts (kW); no single component of the ripple may exceed 3% of full-power DC load, and even less ripple is allowed above 2 kilo-Hertz (kHz); and no instantaneous deviation, plus or minus, of the power draw from the average DC load may be greater than 55 kW, or approximately 5.5% of full-power load.

Meeting the requirements specified above is complicated for multiple missions with diverse waveform types, such as anti-air warfare (AAW), ballistic missile defense (BMD), etc. In addition, the sum of dynamic power draw on multiple arrays must be taken into consideration. Further, the need for low-latency behavior makes prediction of scheduling decisions difficult.

Figure 1:
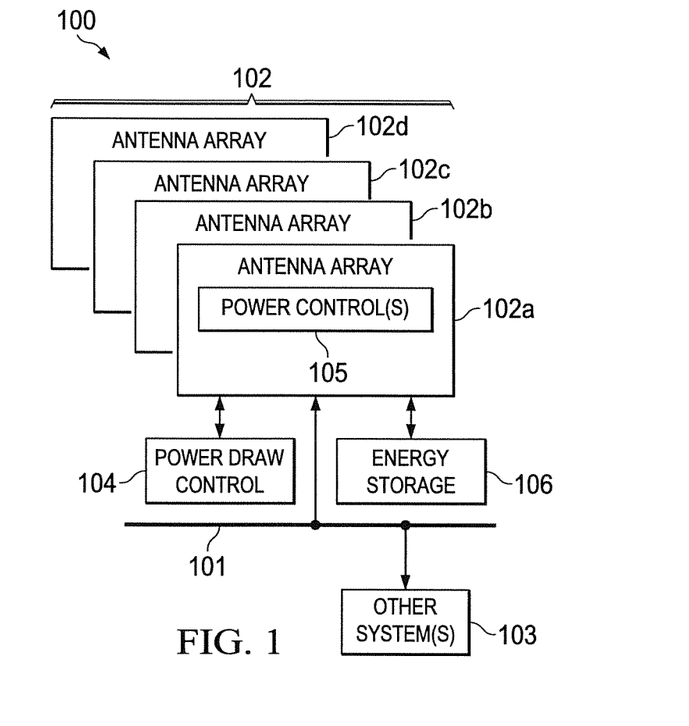
FIG. 1 is a high level block diagram of a system within which real-time, multi-array sum power spectrum control may be implemented in accordance with embodiments of the present disclosure.

FIG. 1 is a high level block diagram of a system within which real-time, multi-array sum power spectrum control may be implemented in accordance with embodiments of the present disclosure. The system 100 includes a DC power transmission cable 101 coupled to and supplying DC power to a multi-array antenna system 102 as well as to other system(s) 103 (e.g., motors, etc.). The multi-array antenna system 102 is made up of multiple arrays 102a, . . . , etc. (four arrays 102a-102d in the example shown, corresponding to four "faces"). A power draw control system 104 made up of a combination of programmable hardware and software is communicably coupled to the arrays 102a-102d. Although depicted in FIG. 1 as at least partially separate from the arrays 102a-102d, a portion of the power draw control system 104 (e.g., switches, "dummy" loads, etc.) may actually be implemented by power controls 105 located within each of the respective arrays 102a-102d. Energy storage 106 in the form of capacitor banks (for instance) is also electrically coupled to the arrays 102a-102d (or may be implemented within the arrays 102a-102d, as described below), selectively under the control of the power draw control system 104, and may be fully or partially distributed among the arrays 102a-102d rather than implemented as a single mass energy storage as depicted in FIG. 1.

The combination of hardware and software components implementing the power draw control system 104 includes a power draw decision algorithm, which computes the power draw for each array 102a-102d on a dwell-by-dwell basis using a custom linear optimization:

TABLE I

|  |  | $_1S_i$ $_2S_i$ $_3S_i$ $_4S_i$ $d_i$ | $_1S_{i+1}$ $_2S_{i+1}$ $_3S_{i+1}$ $_4S_{i+1}$ $d_{i+1}$ | $_1S_{i+2}$ $_2S_{i+2}$ $_3S_{i+2}$ $_4S_{i+2}$ $d_{i+2}$ | $_1S_{i+3}$ $_2S_{i+3}$ $_3S_{i+3}$ $_4S_{i+3}$ $d_{i+3}$ | $_1S_{i+4}$ $_2S_{i+4}$ $_3S_{i+4}$ $_4S_{i+4}$ $d_{i+4}$ |  |
|---|---|---|---|---|---|---|---|
| Face 1 (102a) | Power Draw | $_1D_i$ | $_1D_{i+1}$ | $_1D_{i+2}$ | $_1D_{i+3}$ | $_1D_{i+4}$ | ... |
|  | Power Unalloac. | $_1U_i$ | $_1U_{i+1}$ | $_1U_{i+2}$ | $_1U_{i+3}$ | $_1U_{i+4}$ | ... |
| Face 2 (102b) | Power Draw | $_2D_i$ | $_2D_{i+1}$ | $_2D_{i+2}$ | $_2D_{i+3}$ | $_2D_{i+4}$ | ... |
|  | Power Unalloac. | $_2U_i$ | $_2U_{i+1}$ | $_2U_{i+2}$ | $_2U_{i+3}$ | $_2U_{i+4}$ | ... |
| Face 3 (102c) | Power Draw | $_3D_i$ | $_3D_{i+1}$ | $_3D_{i+2}$ | $_3D_{i+3}$ | $_3D_{i+4}$ | ... |
|  | Power Unalloac. | $_3U_i$ | $_3U_{i+1}$ | $_3U_{i+2}$ | $_3U_{i+3}$ | $_3U_{i+4}$ | ... |
| Face 4 (102d) | Power Draw | $_4D_i$ | $_4D_{i+1}$ | $_4D_{i+2}$ | $_4D_{i+3}$ | $_4D_{i+4}$ | ... |
|  | Power Unalloac. | $_4U_i$ | $_4U_{i+1}$ | $_4U_{i+2}$ | $_4U_{i+3}$ | $_4U_{i+4}$ | ... |

For the variables in TABLE I above, the leading subscript f ∈ {1, 2, 3, 4} identifies the multi-array antenna system face (i.e., Face 1, array 102a; Face 2, array 102b; Face 3, array 102c; or Face 4, array 102d) while the trailing subscript indicates a particular transmit/receive (Tx/Rx) dwell period i, i+1, i+2, etc. The dwell period durations $d_i$, $d_{i+1}$, $d_{i+2}$, etc. are generally not of identical lengths. The rate of power draw $_fD_i$ is the power that may (will) be drawn from the respective face f during dwell period i, while the rate of power spend $_fS_i$ is the amount of power needed for the transmit/receive operation by the respective face f during dwell period i. An unallocated amount of power $_fU_i$ will be "wasted" by the respective face f (e.g., by "dummy" loads) during dwell period i if necessary to keep the total RMS ripple within constraints.

The constraints employed by the power draw decision algorithm may be expressed as $$_fY_0 + \sum_{t=0}^{h} d_t(_fD_t - _fU_t - _fS_t) \geq E_{min}, f \in \{1, 2, 3, 4\},$$

$$_fY_0 + \sum_{t=0}^{h} d_t(_fD_t - _fU_t - _fS_t) \leq E_{max}, f \in \{1, 2, 3, 4\},$$

$$\sum_{f=1}^{4} {}_fD_t \leq P_{max}, \forall\, t, \text{ and}$$

$$\sum_{f=1}^{4} {}_fD_t \geq P_{min}, \forall\, t,$$

where $_fY_0$ is an initial energy resource state for the respective face f at the start of a dwell period, $E_{min}$ and $E_{max}$ are respectively minimum and maximum energies allowed under the ripple constraints, and $P_{max}$ and $P_{min}$ are respectively maximum and minimum powers allowed under the ripple constraints. In the first two equations above, the dwell periods are denoted by the trailing subscript t, the duration of a respective dwell period is given by $d_t$, and h is a predetermined number of dwell periods to follow a current dwell period t=0. Thus, in applying the rippled constraints defined by the equations, the power draw decision algorithm takes into account a number h−1 of dwell periods subsequent to the current dwell period, which will include both future transmit/receive actions that will be sent to the array and intervening "empty" dwell periods.

While the expressions above are written in terms of energy and power, those skilled in the art will recognize that the expressions can be readily re-written in a straightforward manner to state the power draw decision algorithm constraints in terms of voltage (or charge) and current, which may have some advantages in designing the implementation.

Figure 2:
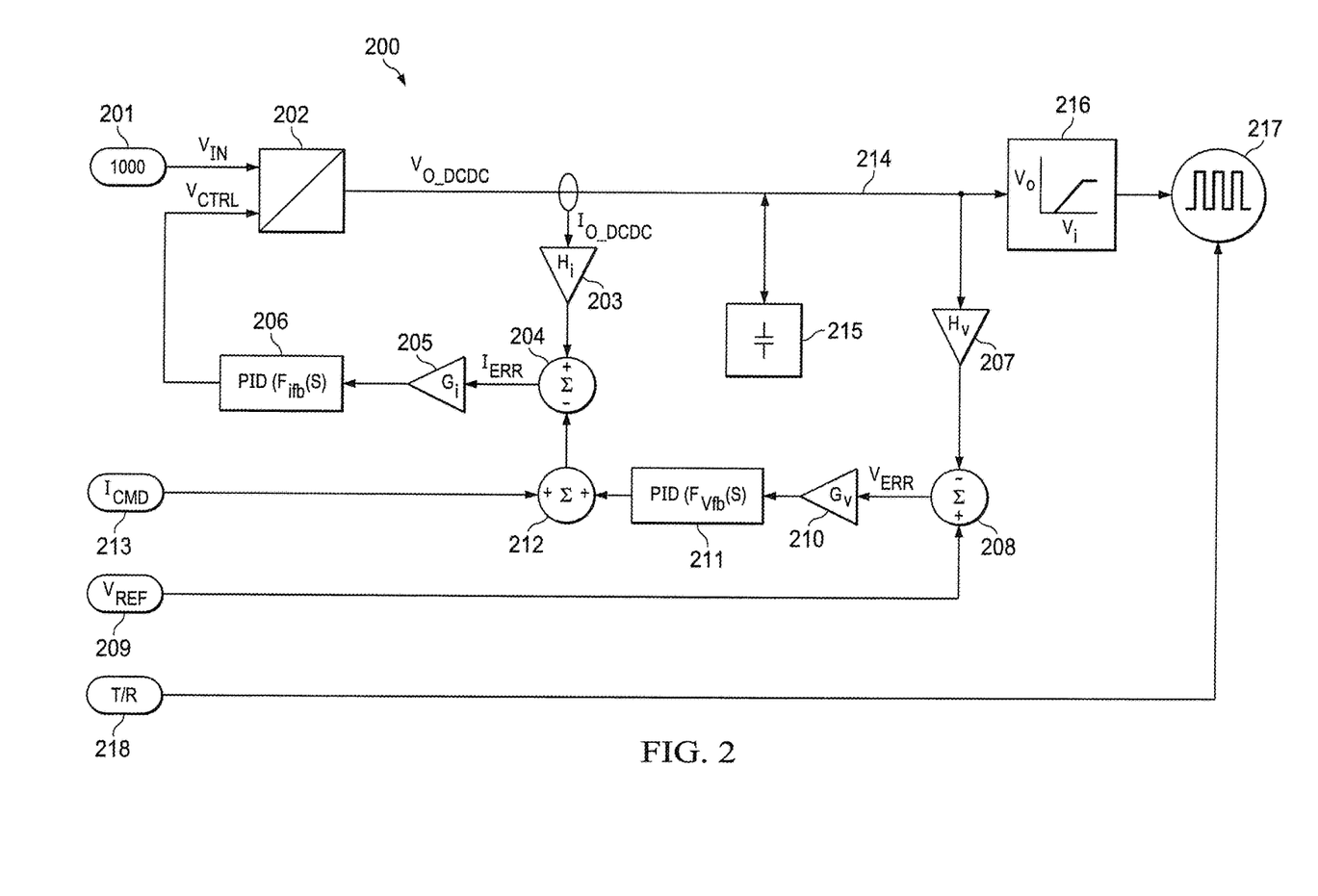
FIG. 2 is a circuit diagram of a circuit employed within a real-time, multi-array sum power spectrum control system in accordance with embodiments of the present disclosure.

FIG. 2 is a circuit diagram of a circuit employed within a real-time, multi-array sum power spectrum control system in accordance with embodiments of the present disclosure. The circuit 200 forms a portion of the power draw control system 104. The circuit 200 includes an input 201 at which an input signal $V_{IN}$ is received. The input signal $V_{IN}$ is a DC power signal from the DC power transmission cable 101, and may have a magnitude of, for example, 1,000 volts (V). The input signal $V_{IN}$ is received by a DC-DC converter 202, together with a control signal $V_{CTRL}$. The DC-DC converter 202 outputs a voltage signal $V_{O\_DCDC}$ that is proportional to the input signal $V_{IN}$, at a proportion determined by the control signal $V_{CTRL}$.

A current $I_{O\_DCDC}$ representative of the output current for the output voltage signal $V_{O\_DCDC}$ of DC-DC converter 202 is received by an amplifier 203 with a transfer function $H_i$, the output of which is received at a negative input to a summing circuit 204. The output of the summing circuit 204 is a current error signal $I_{err}$, received by an amplifier 205 with a transfer function $G_i$. The output of the amplifier 205 is received by a proportional-integral-derivative (PID) controller 206, which applies a current feedback control function $F_{Ifb}(s)$ to the received signal and produces the feedback control voltage signal $V_{CTRL}$ employed by DC-DC converter 202.

The voltage signal $V_{O\_DCDC}$ output by the DC-DC converter 202 is also received as an input by an amplifier 207 with a transfer function $H_v$ in a second portion of the feedback loop. The output of the amplifier 207 is received at an input to a summing circuit 208, which also receives a reference voltage $V_{REF}$ from an input 209. The output of the summing circuit 208 is a voltage error signal $V_{ERR}$, which is received by an amplifier 210 with a transfer function $G_v$. The output of amplifier 210 is received by a PID controller 211, which applies a voltage feedback control function $F_{Vfb}(s)$ to the received signal and produces an output received by a summing circuit 212. The summing circuit 212 also received a signal $I_{CMD}$ from the input 213 and outputs a signal received by the summing circuit 204. The signal $I_{CMD}$ indicates a current draw required to maintain a constant average voltage on the capacitor bank (energy storage 215 discussed below).

The signal line 214 for voltage signal $V_{O\_DCDC}$ is bi-directionally connected to the energy storage 215, which may be (for example) a 0.12 Farad (F) capacitor. The energy storage 215 may thus receive energy from or contribute energy to the signal line 214, depending on the relative voltage levels on the signal line 214 and across the terminals of the energy storage 215. The voltage signal $V_{O\_DCDC}$ from the DC-DC converter 202 is also received by linear regulators 216, which regulate the linearity of a voltage signal at the output and received by RF modules 217. The RF modules 217 also receive a transmit/receive (T/R) command signal at an input 218, indicating when the RF modules 217 should transmit and receive (essentially turning the RF modules 217 on or off). Collectively, the signals $V_{REF}$ on input 209, $I_{CMD}$ on input 213 and T/R command on input 218 comprise scheduler inputs to the circuit 200.

Figure 3:
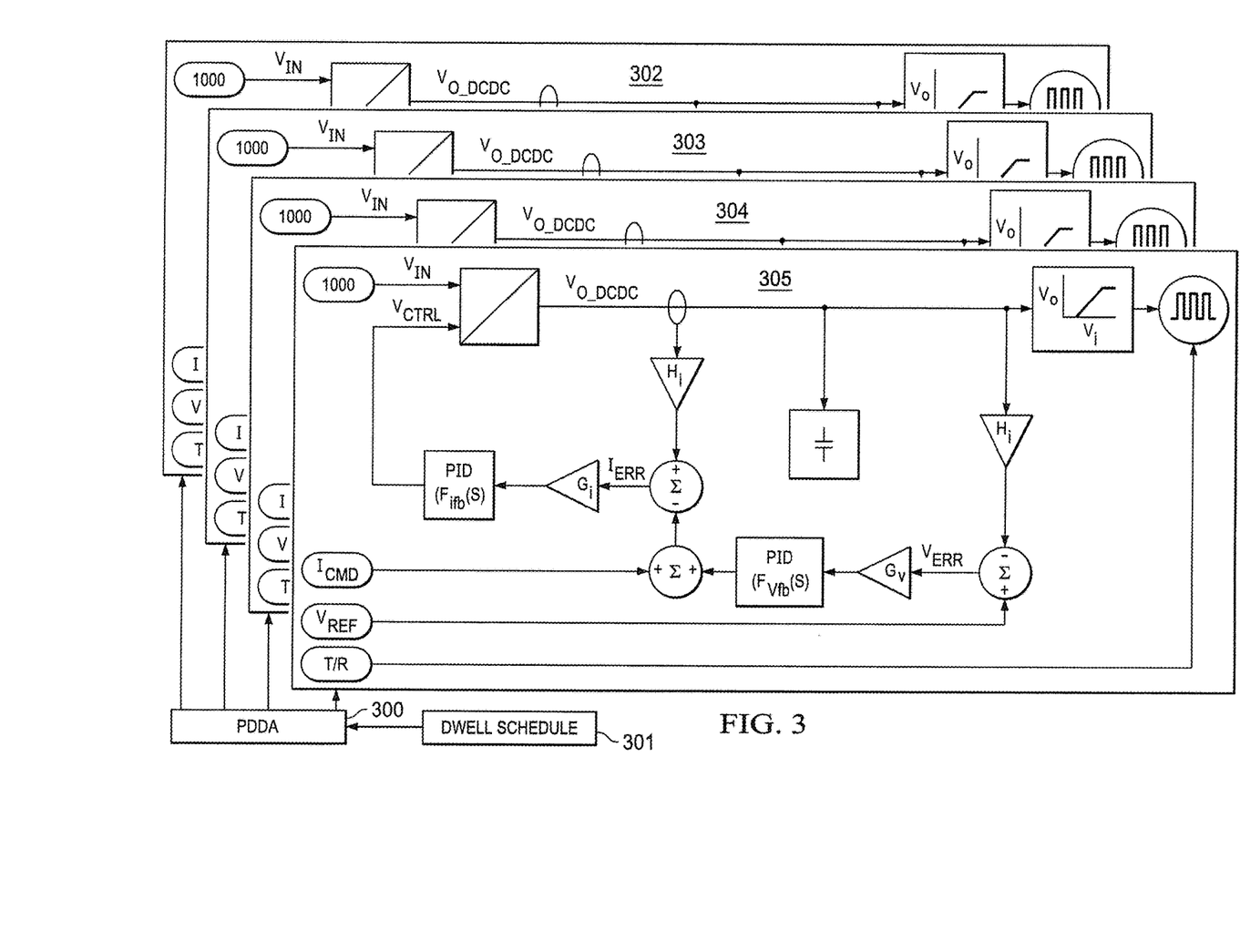
FIG. 3 diagrammatically illustrates operation of a real-time, multi-array sum power spectrum control system in accordance with embodiments of the present disclosure.

FIG. 3 diagrammatically illustrates operation of a real-time, multi-array sum power spectrum control system in accordance with embodiments of the present disclosure. The power draw decision algorithm (PDDA) 300, forming part of radar control software executing within one or more radar control processors or controllers (not shown) within the power draw control system 104, receives or accesses a dwell schedule 301 stored in one or more memories (also not shown) within the power draw control system 104. The dwell schedule 301 includes transmit and receive actions, and must allow optimization to meet the ripple constraints to be feasible. Based on the dwell schedule and the equations stated above, the PDDA 300 issues power draw commands and T/R action commands to sets of instances of the circuit 200 in FIG. 2. In the example illustrated, four sets 302, 303, 304 and 305 of instances of circuit 200 are provided, one for each of the array faces 102. Each set 302, 303, 304 and 305 normally comprises multiple instances of the circuit 200, up to several hundred (e.g., 888 instances per set). The energy storage 215 in all instances of the circuit 200 collectively form the energy storage 106 depicted in FIG. 1. The instances of the circuit 200 within a given set 302, 303, 304 or 305 are controlled together (in conjunction with each other), but the sets 302, 303, 304 and 305 themselves are controlled independently from each other by the PDDA 300.

Figure 4A:
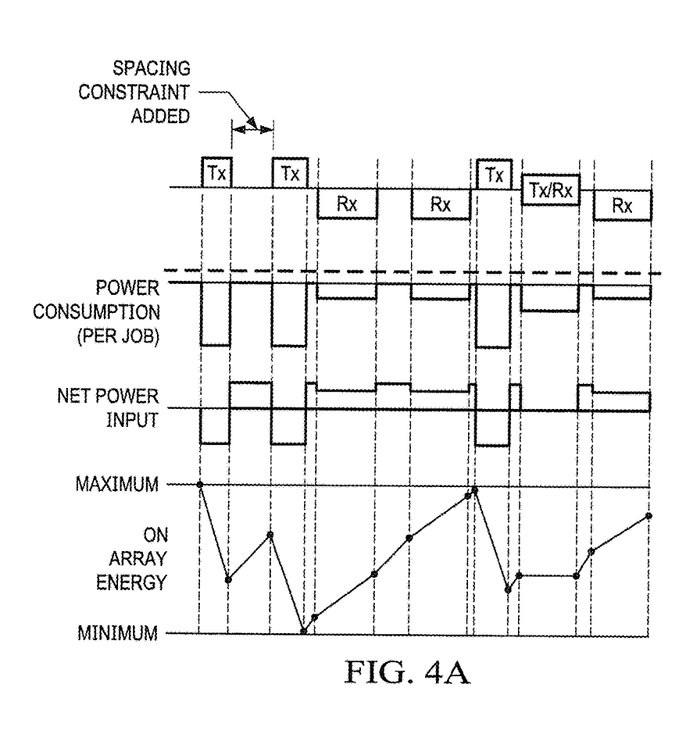
FIGS. 4A through 4C are plots illustrating operation of a real-time, multi-array sum power spectrum control system in accordance with embodiments of the present disclosure.
Figure 4B:
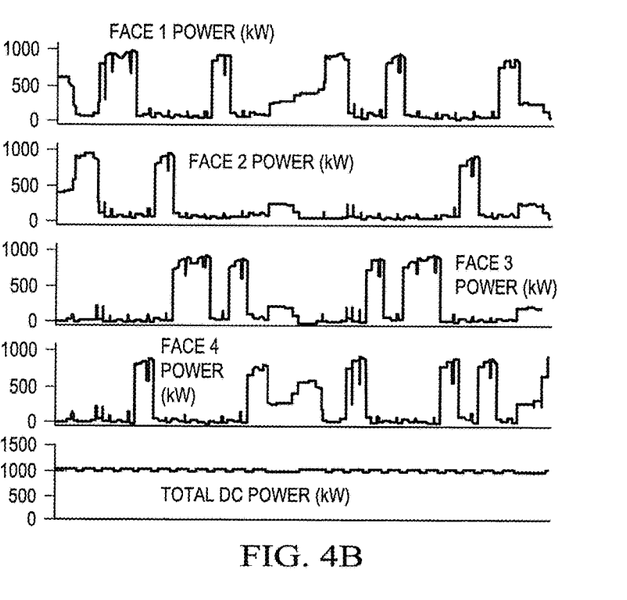
Figure 4C:
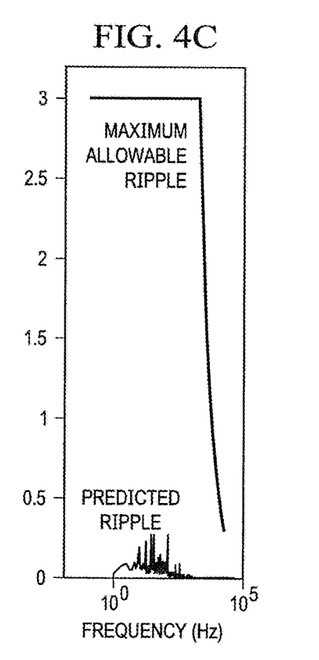

FIGS. 4A through 4C are plots illustrating operation of a real-time, multi-array sum power spectrum control system in accordance with embodiments of the present disclosure. Taken in combination, the hardware and software of FIGS. 1, 2 and 3 operate in what might be considered a just-in-time power delivery system. Based on the dwell schedule for all faces as controlled and modified (as necessary) by a scheduler forming part of the radar control software, power draw is switched rapidly between array faces as needed. The instantaneous sum of power drawn by all array faces remains at a relatively constant power draw, plus (or minus) a small ripple.

As described above, excess power supply that could cause ripple to exceed the constraints may be routed to loads for each face switched into or out of connection with the supply line 101 in order to "waste" or disperse an amount of power $_fU_i$ for a given dwell period. The collective energy storage 215 for all instances of a set 302, 303, 304 or 305 of circuits 200 for an array face may also draw or contribute energy during a dwell period, as necessary. As illustrated in FIG. 4A, however, when either or both of the waste power $_fU_i$ and/or the draw or contribution of energy from the energy storage 215 is insufficient to prevent ripple from exceeding ripple constraints, the duration of "empty" dwell periods, during which no transmit or receive tasks are performed, is increased. In FIG. 4A, a sequence of transmit and receive tasks are indicated on the top line. As apparent, the dwell times for transmit and receive tasks need not be uniform, and the duration of empty dwell periods between transmit and receive tasks may likewise vary substantially. The total power consumption per dwell period (i.e., per transmit/receive task) is illustrated on the second line in FIG. 4A, while the net power input required based on total energy resources is illustrated on the third line. The bottom trace in FIG. 4A illustrates on-array energy fluctuations. As shown for the first and second transmit jobs on the top line, a spacing constraint between consecutive transmit and receive tasks is added as necessary to maintain compliance with ripple constraints. The computations represented by FIG. 4A are performed independently for all resources, although the aggregate is employed to determine when a spacing constraint of the type illustrated must be applied by the scheduler to enforce power draw ripple limits.

FIG. 4B illustrates, in the top four traces, the power drawn by each of the four array faces for the exemplary embodiment, together with the total DC power draw for all four faces together in the bottom trace. The PDDA 300 adjusts power to each face so that the total remains relatively constant as shown in the bottom trace. FIG. 4C illustrates the performance of the real-time, multi-array sum power spectrum control system, in which ripple is much less than 3%.

Figure 5:
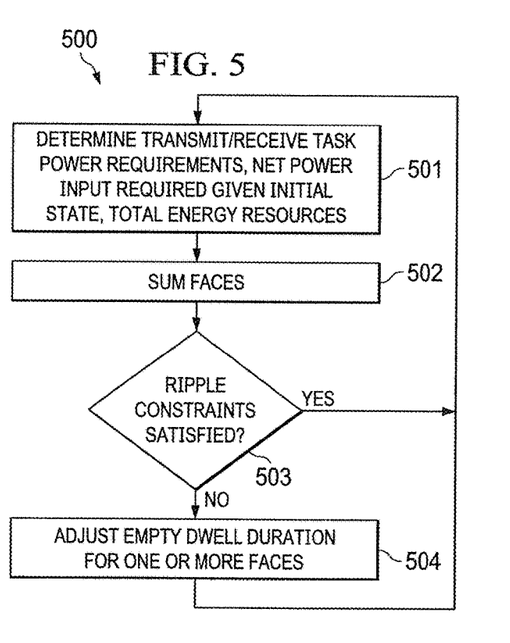
FIG. 5 is a high level flowchart for a process of real-time, multi-array sum power spectrum control in accordance with embodiments of the present disclosure.

FIG. 5 is a high level flowchart for a process of real-time, multi-array sum power spectrum control in accordance with embodiments of the present disclosure. While each process flow and/or event sequence depicted in the figures and described involves a sequence of steps and/or events, occurring either in series or in tandem, unless explicitly stated or otherwise self-evident (e.g., a signal cannot be received before being transmitted), no inference should be drawn regarding specific order of performance of steps or occurrence of events, performance of steps or portions thereof or occurrence of events serially rather than concurrently or in an overlapping manner, or performance the steps or occurrence of the events depicted exclusively without the occurrence of intervening or intermediate steps or events. Moreover, those skilled in the art will recognize that complete processes and event sequences are not illustrated or described. Instead, for simplicity and clarity, only so much of the respective processes and event sequences as is unique to the present disclosure or necessary for an understanding of the present disclosure is depicted and described.

The process 500 illustrated by FIG. 5 occurs prior to computing power draw commands for each array according to the equations listed above. The process 500 begins with determining transmit/receive task power requirements (if any) for a current dwell period on each array face (step 501), together with the net power input required for each array face given the initial state of the respective face and the total energy resource of the face. The power draw for all array faces is then summed (step 502). A determination is made as to whether ripple constraints are satisfied (step 503) by the total power draw. If not, adjustments to adjacent empty dwell period durations for one or more faces are made (step 504) to maintain compliance with ripple constraints, before the process is started over for the next dwell period.

The real-time, multi-array sum power spectrum control system of the present disclosure coordinates dwell-by-dwell power draw across multiple arrays with real-time external power draw commands. Alternative power ripple control systems may manage ripple by feedback-only control techniques and passive filter banks, or by making changes to scheduling algorithms to reduce ripple (e.g., DBR). In the present disclosure, however, coordinated control of dwell-by-dwell power draw on multiple arrays is employed to achieve low ripple on sum power draw. Independent control signals to each array are employed, instead of traditional feedback-only control and localized filtering. Real-time optimization depends on future T/R actions not yet sent to the array, within a horizon committed by the scheduler. This approach decouples DC/DC converter power draw from TR module power draw at fine time scales, while retaining scheduling flexibility (i.e., scheduling rules need not be changed to reduce ripple). As a result, low ripple on a large phased array (single or multiple faces) is maintained without a dedicated filter between the radar and the power supply.

The system of the present disclosure reduces or eliminates the large off-array filtering hardware of alternative ripple control systems that costs space, weight, and power efficiency. This increases space, weight and power (SWaP) margins, reduces integration cost/risk, and reduces maintenance costs. For ground-based mobile systems, reduced system weight and higher reliability are achieved. For large phased array installations, higher power efficiency is provided with extended generator life. For naval and airborne systems, a better SWaP margin is provided in designs where every cubic centimeter of space, every ounce of weight, and every Watt of power is closely scrutinized.

Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

To aid the Patent Office and any readers of any patent issued on this application in interpreting the claims appended hereto, applicants wish to note that they do not intend any of the appended claims or claim elements to invoke 35 U.S.C. §112(f) unless the words "means for" or "step for" are explicitly used in the particular claim.

What is claimed is:

1. An apparatus, comprising:
a plurality of radar arrays; and
a power control system configured to issue power draw commands to each of the radar arrays, the power draw commands configured to control direct current (DC) power draw by the respective radar array on a dwell-by-dwell basis, taking into account a predetermined number of future dwell periods within a dwell schedule for the respective radar array;
the power control system further configured to adjust a duration of an empty dwell period between two consecutive transmit and/or receive tasks within the dwell schedule for the respective radar array in order to maintain less than a predetermined ripple on total DC power drawn from a source of the DC power by a radar system that includes the plurality of radar arrays;
the power control system further configured to constrain total DC power draw on a dwell-by-dwell basis for all of the radar arrays, collectively.

2. The apparatus according to claim 1, wherein the power control system is configured to determine a rate of DC power draw on a dwell-by-dwell basis by each of the radar arrays.

3. The apparatus according to claim 1, wherein the power control system is configured to constrain the total DC power draw on a dwell-by-dwell basis for all of the radar arrays, collectively, according to:

$$_fY_0 + \sum_{t=0}^{h} d_t(_fD_t - _fU_t - _fS_t) \geq E_{min}, f \in \{1, 2, 3, 4\},$$

$$_fY_0 + \sum_{t=0}^{h} d_t(_fD_t - _fU_t - _fS_t) \leq E_{max}, f \in \{1, 2, 3, 4\},$$

$$\sum_{f=1}^{4} {}_fD_t \leq P_{max}, \forall\, t, \text{ and}$$

$$\sum_{f=1}^{4} {}_fD_t \geq P_{min}, \forall\, t,$$

where $_fY_0$ is an initial energy resource state for a respective face f at a start of a dwell period t, $_fD_t$ is a rate of power draw to be drawn by the respective face f during the dwell period t, $_fS_t$ is a rate of power spend for a transmit/receive operation, if any, by the respective face f during the dwell period t, $_fU_t$ is a rate of unallocated power directed to a load other than one of the faces f during the dwell period t to reduce excess power at the respective face f, $d_t$ is a duration of the dwell period t, $E_{min}$ and $E_{max}$ are respectively minimum and maximum energies allowed to maintain less than the predetermined ripple, and $P_{max}$ and $P_{min}$ are respectively maximum and minimum powers allowed to maintain less than the predetermined ripple.

4. The apparatus according to claim 1, wherein the power control system comprises a plurality of circuits for each of the plurality of radar arrays, each circuit including:
a DC/DC converter having a current error feedback loop and a voltage error feedback loop configured to receive a reference voltage and a current command portion of each of the power draw commands,
an energy storage connected to an output of the DC/DC converter,
one or more linear regulators connected to the output of the DC/DC converter, and
one or more radio frequency (RF) modules connected to one or more outputs of the one or more linear regulators and configured to receive a transmit/receive command portion of each of the power draw commands.

5. The apparatus according to claim 4, wherein:
the plurality of circuits for each of the plurality of radar arrays are controlled together.

6. The apparatus according to claim 4, wherein the energy storage comprises one or more capacitors.

7. The apparatus according to claim 4, wherein:
the power control system comprises one or more loads that are configured to be selectively connected to one of the radar arrays to disperse excess power at the respective radar array.

8. The apparatus according to claim 1, wherein the power control system is configured to sum power requirements for the radar arrays to determine the total DC power drawn from the source by the radar system.

9. The apparatus according to claim 1, wherein the power control system is configured to extend the duration of the empty dwell period.

10. The apparatus according to claim 1, wherein the power control system is configured to constrain the total DC power draw on a dwell-by-dwell basis for all of the radar arrays, collectively, based on an initial energy resource state for a respective face at a start of a dwell period, a rate of power draw to be drawn by the respective face during the dwell period, a rate of power spend for a transmit/receive operation, if any, by the respective face during the dwell period, a rate of unallocated power directed to a load other than one of the faces during the dwell period to reduce excess power at the respective face, a duration of the dwell period, minimum and maximum energies allowed to maintain less than the predetermined ripple, and maximum and minimum powers allowed to maintain less than the predetermined ripple.

11. A method, comprising:
coupling a plurality of radar arrays to a source of direct current (DC) power;
issuing power draw commands to each of the radar arrays, the power draw commands controlling DC power draw by the respective radar array on a dwell-by-dwell basis, taking into account a predetermined number of future dwell periods within a dwell schedule for the respective radar array;
adjusting a duration of an empty dwell period between two consecutive transmit and/or receive tasks within the dwell schedule for the respective radar array in order to maintain less than a predetermined ripple on total DC power drawn from the source by a radar system that includes the plurality of radar arrays; and
constraining total DC power draw on a dwell-by-dwell basis for all of the radar arrays, collectively.

12. The method according to claim 11, further comprising:
determining a rate of DC power draw on a dwell-by-dwell basis by each of the radar arrays.

13. The method according to claim 11, wherein the total DC power draw is constrained on a dwell-by-dwell basis for all of the radar arrays, collectively, according to:

$$_fY_0 + \sum_{t=0}^{h} d_t(_fD_t - _fU_t - _fS_t) \geq E_{min}, f \in \{1, 2, 3, 4\},$$

$$_fY_0 + \sum_{t=0}^{h} d_t(_fD_t - _fU_t - _fS_t) \leq E_{max}, f \in \{1, 2, 3, 4\},$$

$$\sum_{f=1}^{4} {_fD_t} \leq P_{max}, \forall\, t, \text{ and}$$

$$\sum_{f=1}^{4} {_fD_t} \geq P_{min}, \forall\, t,$$

where $_fY_0$ is an initial energy resource state for a respective face f at a start of a dwell period t, $_fD_t$ is a rate of power draw to be drawn by the respective face f during the dwell period t, $_fS_t$ is a rate of power spend for a transmit/receive operation, if any, by the respective face f during the dwell period t, $_fU_t$ is a rate of unallocated power directed to a load other than one of the faces f during the dwell period t to reduce excess power at the respective face f, $d_t$ is a duration of the dwell period t, $E_{min}$ and $E_{max}$ are respectively minimum and maximum energies allowed to maintain less than the predetermined ripple, and $P_{max}$ and $P_{min}$ are respectively maximum and minimum powers allowed to maintain less than the predetermined ripple.

14. The method according to claim 11, further comprising:
implementing a power control system comprising a plurality of circuits for each of the plurality of radar arrays, each circuit including:
a DC/DC converter having a current error feedback loop and a voltage error feedback loop configured to receive a reference voltage and a current command portion of each of the power draw commands,
an energy storage connected to an output of the DC/DC converter,
one or more linear regulators connected to the output of the DC/DC converter, and
one or more radio frequency (RF) modules connected to one or more outputs of the one or more linear regulators and configured to receive a transmit/receive command portion of each of the power draw commands.

15. The method according to claim 14, wherein:
the plurality of circuits for each of the plurality of radar arrays are controlled together.

16. The method according to claim 14, wherein the energy storage comprises one or more capacitors.

17. The method according to claim 14, wherein:
the power control system comprises one or more loads that are configured to be selectively connected to one of the radar arrays to disperse excess power at the respective radar array.

18. The method according to claim 11, further comprising:
summing power requirements for the radar arrays to determine the total DC power drawn from the DC power source by the radar system.

19. The method according to claim 11, further comprising:
extending the duration of the empty dwell period.

20. The method according to claim 11, wherein the total DC power draw is constrained on a dwell-by-dwell basis for all of the radar arrays, collectively, based on an initial energy resource state for a respective face at a start of a dwell period, a rate of power draw to be drawn by the respective face during the dwell period, a rate of power spend for a transmit/receive operation, if any, by the respective face during the dwell period, a rate of unallocated power directed to a load other than one of the faces during the dwell period to reduce excess power at the respective face, a duration of the dwell period, minimum and maximum energies allowed to maintain less than the predetermined ripple, and maximum and minimum powers allowed to maintain less than the predetermined ripple.

* * * * *

UNITED STATES PATENT AND TRADEMARK OFFICE
CERTIFICATE OF CORRECTION

PATENT NO. : 9,945,932 B2
APPLICATION NO. : 14/502797
DATED : April 17, 2018
INVENTOR(S) : Andrew D. Huss et al.

Page 1 of 1

It is certified that error appears in the above-identified patent and that said Letters Patent is hereby corrected as shown below:

In the Specification

Column 1, before BACKGROUND OF THE DISCLOSURE, insert the following:
--GOVERNMENT RIGHTS
This invention was made with U.S. government support under contract number N00024-14-C-5315 awarded by the United States Navy. The government has certain rights in the invention.--

Signed and Sealed this
Fifteenth Day of May, 2018

Andrei Iancu
*Director of the United States Patent and Trademark Office*